United States Patent [19]

Linder et al.

[11] Patent Number: 4,720,345
[45] Date of Patent: Jan. 19, 1988

[54] SEMIPERMEABLE MEMBRANES OF MODIFIED STYRENE-BASED POLYMERS, PROCESS FOR THEIR MANUFACTURE AND THEIR USE

[75] Inventors: Charles Linder, Rehovot; Gershon Aviv, Tel Aviv; Mordechai Perry, Petach Tikvah; Reuven Kotraro, Rehovot, all of Israel

[73] Assignee: Aligena AG, Basel, Switzerland

[21] Appl. No.: 841,057

[22] Filed: Mar. 17, 1986

Related U.S. Application Data

[63] Continuation of Ser. No. 451,370, Dec. 20, 1982, abandoned.

[30] Foreign Application Priority Data

Dec. 21, 1981 [CH] Switzerland ............ 8174/81

[51] Int. Cl.$^4$ ............................................. B01D 13/00
[52] U.S. Cl. ....................................... 210/650; 210/654; 210/500.29; 210/500.34; 210/500.37; 210/500.38; 210/500.41; 210/500.42
[58] Field of Search ............... 210/490, 506, 650, 651, 210/653, 654, 500.29, 500.34, 500.37, 500.38, 500.41, 500.42; 428/315.5; 521/27; 55/158

[56] References Cited

U.S. PATENT DOCUMENTS

| | | | |
|---|---|---|---|
| 3,290,210 | 12/1966 | Engle et al. | 424/142 |
| 3,556,305 | 1/1971 | Shorr | 210/500.2 X |
| 3,567,810 | 3/1971 | Baker | 210/500.2 X |
| 3,615,024 | 10/1971 | Michaels | 264/41 |
| 3,951,815 | 4/1976 | Wrasidlo | 210/500.2 |
| 4,029,582 | 6/1977 | Ishii et al. | 55/158 |
| 4,039,440 | 8/1977 | Cadotte | 210/500.2 X |
| 4,326,958 | 4/1982 | Kawahara | 210/500.2 |
| 4,584,103 | 4/1986 | Linder et al. | 210/650 |

FOREIGN PATENT DOCUMENTS

| | | |
|---|---|---|
| 8945 | 3/1980 | European Pat. Off. . |
| 0025973 | 4/1981 | European Pat. Off. . |
| 1319236 | 6/1973 | United Kingdom . |
| 2000720 | 1/1979 | United Kingdom . |
| 1558807 | 1/1980 | United Kingdom . |
| 2027614 | 2/1980 | United Kingdom . |

OTHER PUBLICATIONS

Sovrirajan, S., *Reverse Osmosis and Synthetic Membranes*, Nat. Res. Con. of Canada, NRCC, No. 15627, 1977, pp. 503, 519, 520.

Frechet, J. M. et al, "Solid-Phase Synthesis of Oligosaccharides . . . ", J.A.C.S., vol. 93, No. 2, 1/27/71, pp. 492-496.

Mitchell et al, "Preparation of Aminomethyl-Polystyrene . . . ", Tetrahedron Letters, No. 42, pp. 3795-3798, 1976, Pergamon Press.

*Primary Examiner*—David Sadowski
*Attorney, Agent, or Firm*—Wenderoth, Lind & Ponack

[57] ABSTRACT

Semipermeable membranes of modified styrene polymers are obtained by modifying styrene polymers containing reactive groups (A) through chemical reaction with
  (a) a monomeric compound containing at least two functional groups,
  (b) a polyfunctional oligomer of polymer, and
  (c) a compound containing at least one, preferably two groups capable of reaction with (b), provided that the reactive groups are amino, hydroxyl or mercapto groups,
(B) through chemical reaction with components (b) and (c), provided that the reactive groups are halogen atoms, aldehyde, cyanate or thiocyanate groups, or
(C) through chemical reaction with hydroxylamine and components (a), (b) and (c), provided that the reactive group is a nitrile group.

The new membranes can be used in reverse osmosis and ultrafiltration processes. They show good permeability (flux) and rejection characteristics as well as good solvent, compaction and temperature resistance. Their range of molecular cut-offs lies preferably between about 200 and 2000.

27 Claims, No Drawings

SEMIPERMEABLE MEMBRANES OF MODIFIED STYRENE-BASED POLYMERS, PROCESS FOR THEIR MANUFACTURE AND THEIR USE

This application is a continuation of now abandoned application Ser. No. 451,370, filed Dec. 20, 1982.

The present invention relates to improved semipermeable membranes useful in diffusion processes such as reverse osmosis (RO) or ultra-filtration (UF). Specifically the invention provides membranes made from chemically modified styrene-based polymers showing improved solvent, heat and compaction resistance as well as good permeability (flux) and rejection characteristics.

The inventive membranes are in general composed of a thin crosslinked hydrophilic film, chemically bonded to a thicker more porous, crosslinked membrane. Though all the components of the membrane (the thin film and thicker membrane) comprise the invention, the layer may be thought of as improving the rejection of the support membrane to solutes and increasing the efficiency of separating low molecular weight monovalent salts from multivalent or higher molecular weight solutes. In as far as the membrane components are each crosslinked, and also bound to each other, the membrane exhibits solvent, heat and compaction resistance, and resistance to separation of the individual layers.

Thin film composites have been described for RO membranes. In effect microporous or ultrafiltration (UF) supports are coated with hydrophilic materials and crosslinked with hydrophobic crosslinking agents for salt rejecting (RO) membranes (EP Application No. 8 945, U.S. Pat. No. 3 951 815, GB-PS No. 1 558 807, GB-Patent Application No. 2 027 614 A, U.S. Pat. No. 4 039 440). A cardinal principle of this approach is that during fabrication both the crosslinking agents and its solvent are water insoluble and do not dissolve the thin layer. The said layer may vary in thickness between 1000 to 50000 Å, but is preferably between 2000 to 8000 Å. The attachment of the thin layer to the support relies on physical or mechanical attachment (such as partial penetration into the pores of the substrate). Thus, peeling or detachment is possible and is known to occur. In addition, the support systems are generally made of polymers (polysulfones, polyvinylidene fluorides, and polycarbonates) which are solvent sensitive and may dissolve in non-aqueous solvents.

The membranes according to the present invention comprise vinylaromatic polymers, preferably (co)-polymers on the basis of styrene, modified by a sequence of different chemical reaction steps, said membranes are generally bound onto a porous support.

The polystyrenes are suited for the disclosed invention because they are characterized by chemical (particularly oxidative) and temperature stability, have good membrane forming properties and reactive groups may be easily introduced.

Therefore it is one object of the present invention to provide new semipermeable membranes of modified styrene-based polymers which comprise reactive sites which are modified (A) through chemical reaction with
(a) a monomeric compound containing at least two functional groups,
(b) a polyfunctional oligomer or polymer, and
(c) a compound containing at least one, preferably two groups capable of reaction with (b), provided that the reactive groups correspond to the formulae —$R_1NH_2$, —$R_2OH$ or —$R_2SH$, wherein —$R_1$— is a valence bond, —$C_mH_{2m}$—, —$(CH_2)_qNH(CH_2)_{2-6}$, —$(CH_2)_qO$—$(CH_2)_{2-6}$,

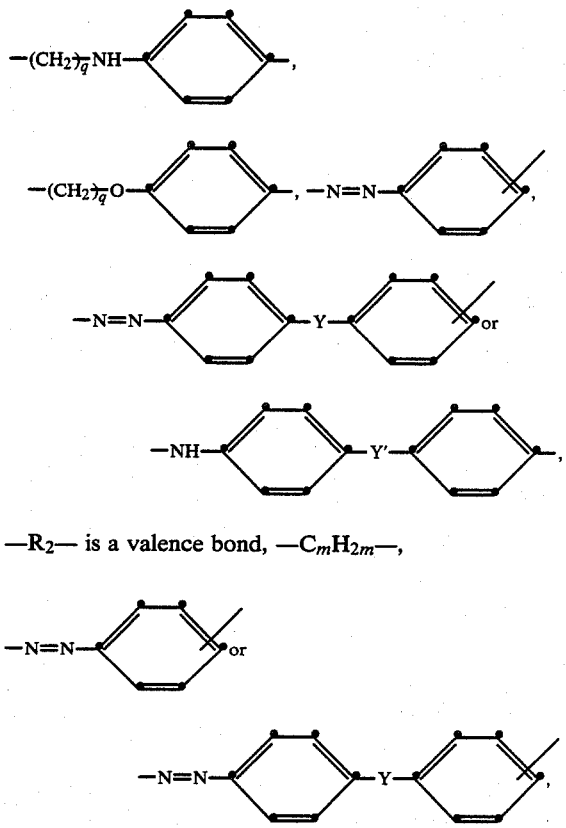

—$R_2$— is a valence bond, —$C_mH_{2m}$—,

Y is a valence bond, —O— or —NH—, Y' is —O—, —S—, —$SO_2$ or

m is an integer of 1 to 6 and q is zero or 1, (B) through chemical reaction with components (b) and (c), provided that the reactive groups correspond to the formulae —$R_3X$, —$R_4CHO$, —NCO or —NCS, wherein —$R_3$— is a valence bond to an aliphatic residue or —$C_mH_{2m}$—, —$R_4$— is a valence bond or —$C_nH_{2n}$—, X is halogen, m is an integer of 1 to 6 and n is an integer of 1 to 5, or (C) through chemical reaction with hydroxylamine and components (a), (b) and (c), provided that the reactive group corresponds to the formula —$R_4CN$, wherein —$R_4$— has the indicated meaning, the degree of reactive groups in the polymers being 0.05 to 3.5, preferably 0.3 to 3.5 milliequivalents/g.

The inventive membranes overcome the shortcomings of such RO composites, such as detachment of layers and further solvent sensitivity are minimized. In addition the coated layer is generally thinner than that disclosed for RO membranes (preferably from monomolecular to 1000 Å rather than 1000 to 5000 Å), and the final crosslinking step is carried out in a hydrophilic solvent (e.g. water) or solvent mixtures containing parts of hydrophilic solvents, e.g. aqueous solutions of acetone, dimethylformamide or N-methylpyrrolidone, with water soluble multifunctional reagents. The final membrane is useful in ultrafiltration and especially for applications in the range of pressures (5 to 50 bar) and cut-offs (200 to 2000 MW) associated with membranes between RO and UF. These cut-offs are decreased by a factor of 2 to 5 (compared to non-modified membranes); the increase of rejection to salts should not be increased to the same extent.

The present invention may be used to modify ultrafiltration or microporous membranes, with average pore size varying from 10 to 5000 Å. The preferred range, however, is 10 to 1000 Å and most preferred 20 to 200 Å for the achievement of optimum rejection with flux.

Another object of the present invention is said membrane of a modified polystyrene bound as film onto a porous support.

Other objects of the present invention are processes for the manufacture of the modified membranes and the composites (superficial films of the modified polymers on porous supports), as well as the use of these membranes in fields involving concentration and purification of liquids, e.g. separating salts from organic compounds (dyes) or purifying waste waters.

These and other objects of the present invention will be apparent from the following detailed description.

Suitable styrene polymers can be obtained through polymerizing of styrene monomers that contain modifiable groups; these polymers are for example homopolymers (of said styrene monomers containing the modifiable groups), copolymers of styrene and a styrene with modifiable groups, copolymers of a monomer other than styrene and a styrene with modifiable groups, or ter- or quaterpolymers of e.g. a styrene with modifiable groups and (one) monomer(s) other than (unsubstituted) styrene, further mixtures of polystyrene or copolymers on the basis of polystyrene with other homo- or copolymers are suitable.

If the styrene polymers are not prepared by using the monomers mentioned before, but are they available as polymers only (e.g. homo-, co-, ter- or quaterpolymers), then even into these polymers reactive sites (groups) can be introduced which are then chemically modified according to the present invention.

The reactive (modifiable) groups can be introduced into the phenyl ring of styrene, into a comonomer, through modification of a side chain (e.g. —CH$_3$→—CH$_2$X) or into the backbone of the polymers (e.g. formation of α-bromo styrene units) by using known chemical methods.

Prior to the introduction of reactive groups the polymers may be defined as follows (structural units):

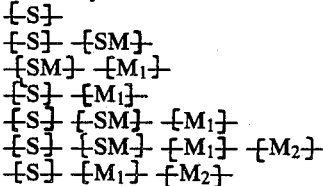

S=styrene, SM=substituted styrene
M$_1$=comonomer, different from ${S}$ and ${SM}$
M$_2$=comonomer, different from ${M_1}$ Examples of substituted styrenes as well as comonomers M$_1$ and M$_2$ are:

o,m,p-methylstyrene, 2,4-, 2,5-, 3,4-, 3,5-dimethylstyrene, 2,4,5- or 2,4,6-trimethylstyrene; o,m,p-ethylstyrene, 2,5- or 3,5-diethylstyrene; m- or p-isopropylstyrene, p-butyl or p-hexylstyrene; methyl styrenes containing alkyl or halogen substituents such as 4-methyl-, 3-ethyl-, 2,3-dimethyl-, 3-chloro-2-methyl-, 3-chloro-4-methyl-, 3-bromo-4-methyl- or 3-fluoro-4-methyl methyl styrene; o,m,p-cyanostyrene; o,m,p-hydroxystyrene; o,m,p-aminostyrene; o,m,p-nitrostyrene; vinylphenylisocyanate, 1,4-dimethyl-2-hydroxystyrene, 3-methoxy-4-hydroxystyrene, 1,5-dimethyl-2-hydroxystyrene, 1,4-dihydroxystyrene, 3,4-dibromo-4-hydroxystyrene, 2-nitro-4-isopropyl styrene; vinylbenzylamine, p-mercaptostyrene; halogenalkylstyrenes with 1 to 6, preferably 1 carbon atom in the alkyl moiety: chloromethyl styrene, bromomethyl styrene, iodomethyl styrene; hydroxyalkylstyrenes with 1 to 6, preferably 1 carbon atom in the alkyl moiety: hydroxymethyl styrene; cyanoalkyl styrenes with 2 to 6, preferably 2 carbon atoms in the alkyl moiety: cyanomethyl styrene; aminoalkyl styrenes with 1 to 6, preferably 1 carbon atoms in the alkyl moiety: aminomethyl styrene; mercaptoalkyl styrenes with 1 to 6, preferably 1 carbon atom in the alkyl moiety: mercaptomethyl styrene.

Suitable comonomers for co- or terpolymerisation are:

Alkoxystyrenes, such as o,m,p-methoxy styrene, 4-methoxy-3-methyl styrene, 2-methoxy-3-methyl styrene, 6-methoxy-3-methyl styrene, o- or p-ethoxy- and further 2,5-, 2,6-, 3,4- or 3,6-dimethyloxystyrene; α-methyl(ethyl-, propyl-) styrene;

α-methylstyrene derivatives with the following substituents:

4-methyl-, 2-chloro-, 4-chloro-, 4-isopropyl-, 2,3-dimethyl-, 3,4-dimethyl-, 3-chloro-2-methyl-, 3-chloro-4-methyl-, 3-bromo-4-methyl-, 3-fluoro-4-methyl-, 2,4-dichloro-; further acrylonitrile, methacrylonitrile, butadiene, methylmethacrylate, methylacrylate, and other acrylic ester of low molecular alcohols; p-methyl styrene, vinyl acetate, vinylidene chloride, vinylidene fluoride, vinyl fluoride, acrylic acid, methacrylic acid; maleic acid anhydride; alkoxy styrenes (mono- and di-substituted); chloro styrenes; vinyl ethers (1 to 4 carbon atoms in the ether moiety); vinyl pyridine, N-vinylpyrrolidone, N-vinylimidazole, p-benzyl styrene or p-cyclohexyl styrene.

Preferred are copolymers (and the membranes obtained) comprising repeating (structural) units of styrene containing reactive (modifiable) groups, modified through chemical reaction according to (A), (B) or (C), the degree of substitution of reactive groups to the phenyl moieties of styrene being 0.05 to 3.5, preferably 0.3 to 3.5 milliequivalents/g, and structural units of vinyl, halogenvinyl or acrylic compounds, further of butadiene, maleic acid or derivatives thereof.

Examples of preferred monomers (with reactive groups) used in the polymerisation step (in order to make a polymer with modifiable groups) are p-cyanostyrene, chloromethylstyrene, p-hydroxystyrene or mercaptostyrene which can be copolymerised together with styrene and other comonomers. The quantity (degree of substitution) of reactive groups would be such that the final polymer has a reactive group concentration of 0.05 (0.3) to 3.5 milliequivalents/g and preferably of 1.0 to 2.5 (1.0 to 2.0) milliequivalents/g.

In order to introduce reactive groups into preformed polymers the following modifications can be used: nitration followed by reduction to an amine; coupling with diazo compounds; chloromethylation; halogenation of aromatic methyl groups with N-bromo-succinimide; formation of methylol groups with formaldehyde; direct aminomethylation with N-(hydroxymethyl)-phthalimide or N-(chloromethyl)-p-phthalimide (Tetrahedron Letters 42, 3795–3798, 1976).

These reactive groups serve directly or after a chemical modification for cross-linking of the polymers (membranes) and for binding a polyfunctional oligomer or polymer which in turn can be further reacted with a polyfunctional ionic or nonionic compound.

Preferred semipermeable membranes are made of (co)polymers with structural units of the formula

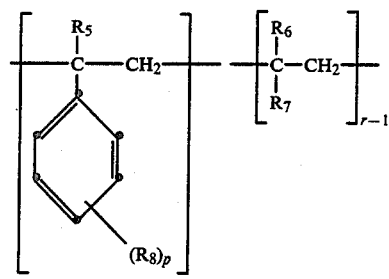

wherein $R_5$ and $R_6$ are independently hydrogen, alkyl of 1 to 4 carbon atoms or halogen, $R_7$ is carboxyl, carbalkoxy with 1 to 8 carbon atoms in the alkoxy moiety, carbonamido ($-CONH_2$) which is optionally N-mono- or N,N-disubstituted, halogen or cyano, and $R_8$ is hydrogen or $-R_1NH_2$, $-R_2OH$ or $R_2SH$, wherein $-R_1-$ is a valence bond, $-C_mH_{2m}-$, $-(CH_2)_{\overline{q}}NH(CH_2)_{\overline{2-6}}$, $-(CH_2)_{\overline{q}}(O(CH_2)_{2-6}$,

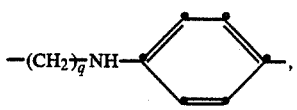

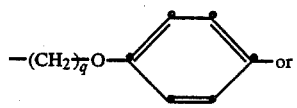

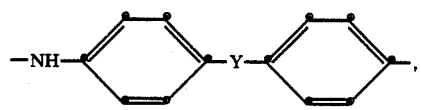

Y is $-O-$, $-SO_2-$ or $-C(CH_3)_2-$, $-R_2-$ is a valence bond, or $-C_mH_{2m}-$, m is an integer of 1 to 6, q is zero or 1, and these structural units (containing the mentioned $R_8$-substituents) being modified through chemical reaction with (a), (b) and (c), indicated hereinbefore;

$R_8$ is also $-R_3X$, $-R_4CHO$, $-NCO$ or $-NCS$, wherein $-R_3-$ is a valence bond to an aliphatic radical or $-C_mH_{2m}-$, $-R_4-$ is a valence bond or $-C_nH_{2n}-$, X is halogen, n is an integer of 1 to 5, m has the indicated meaning, and these structural units being modified through chemical reaction with (b) and (c);

$R_8$ is further $-R_4CN$, wherein $R_4$ has the indicated meaning, and these structural units are modified through chemical reaction with hydroxylamine and components (a), (b) and (c); p is 1 or 2, r is 1 or 2; the degree of substitution of $R_5$ (in the meaning of halogen) and/or of substituent $R_8$—different from hydrogen—being preferably between 0.3 and 3.5 milliequivalents/g.

One preferred (co)polymer with structural units according to formula (1) is such corresponding to formula

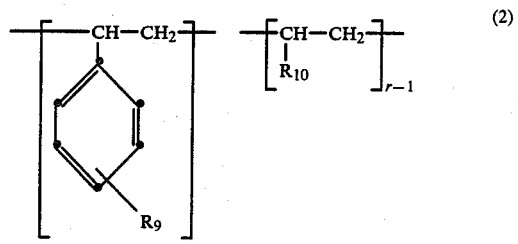

wherein $R_{10}$ is $-COOH$, $-CONH_2$ or $-CN$, r is 1 or 2 and $R_9$ is hydrogen or $-CH_2NH_2$, $-CH_2OH$, $-NH_2$ or

modified through chemical reaction with (a), (b) and (c);

$-CH_2X$, wherein X is halogen, modified through chemical reaction with (b) and (c); or $-CH_2CN$ or $-CN$, modified through chemical reaction with hydroxylamine, (a), (b) and (c);

the degree of substitution of substituentes $R_9$—different from hydrogen—being preferably between 0.3 and 3.5 milliequivalents/g.

$R_5$ in formula (1) is hydrogen, alkyl of 1 to 4 carbon atoms, e.g. ethyl, propyl, isopropyl, butyl and preferably methyl, $R_5$ is further halogen such as fluoro, bromo and especially chloro.

$R_6$ has the meanings of $R_5$, if it is alkyl, methyl is of special importance.

$R_7$ is carboxyl ($-COOH$), optionally esterified (carbalkoxy) with alcohols of 1 to 8 carbon atoms, such as methanol, ethanol, butyl alcohol or octyl alcohol. $R_7$ is further carbonamido ($-CONH_2$), optionally N-mono- or N,N-disubstituted with e.g. alkyl of 1 to 5 carbon atoms.

When $R_7$ is halogen, such as fluoro, bromo or especially chloro the (optional) repeating units of the copolymers are derived from e.g. vinyl(idene)chloride or vinyl(idene)fluoride; when $R_7$ is cyano, the repeating units are derived from (meth)acrylonitrile (if $R_6$ is hydrogen or methyl) which is a preferred comonomer for making polymers useful for the inventive membranes. Other preferred comonomers are e.g. (meth)acrylic acid, (meth)acrylic methylester or (meth)acrylamide.

One further preferred membrane of modified polystyrenes is that comprising repeating units of the formula

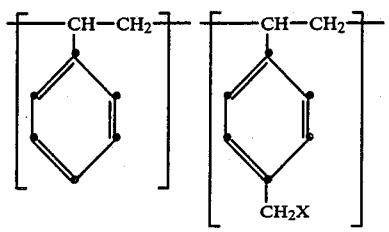 (3)

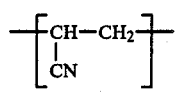

wherein X is halogen, preferably chloro, and the —CH$_2$X radical being modified through chemical reaction with a polyethyleneimine and a reactive azo dyestuff containing sulfonic acid groups and dichlorotriazinyl radicals, the degree of substitution of substituent —CH$_2$X being between 0.3 and 3.5 milliequivalents/g.

Most of the inventively used polymers on the basis of styrene (optionally containing reactive groups, but not yet modified according to the present invention) are commercially available or at least known from the literature; all of them can be prepared via synthetic procedures described in the literature.

Such polymers fall within the scope of this invention if they are film formers and if they contain reactive functional groups or the potential for introducing such groups. Their molecular weights (number average) vary between 5000 to 60,000, though the preferred range for membrane formation is between 20,000 to 40,000. Preferred are homopolystyrenes or copolymers of styrene and the comonomers mentioned above.

The aromatic groups of the styrene polymers allow for the introduction of different reactive functions. The formation of reactive derivatives may be carried out on the monomer unit prior to polymerization, on the polymer prior to dissolving in the casting solvent or in the casting solution itself, or on the final membrane, or via a combination of any of these said procedures. The reactive groups may be further converted to other groups which are finally reacted with the coating polymer. In some instances, it is preferable to convert only the groups on the membranes' surfaces or pores, leaving the bulk of the membrane with the original groups.

With respect to the foregoing there are however two main methods for manufacturing the inventive membranes: either one casts a so-called unmodified polymer onto a support to form a membrane which is then chemically modified or in an alternative route a polymer containing "reactive groups" is used in the casting solution to prepare the membrane which is then modified further.

Therefore—and this is a further object of the present invention—one process for the manufacture of the inventive semipermeable membranes comprises casting a solution containing (I) a polymer on the basis of (poly)styrene and (II) a polar organic solvent or solvent mixture for the polymer and optionally partial solvents, non-solvents, electrolytes and/or surfactants on a (porous) support into a membrane, contacting the membrane with a liquid which is miscible with the polar solvent but is a non-solvent for the membrane to effect coagulation, introducing into said membrane the reactive groups according to (A), (B) or (C) indicated hereinbefore, except they are already present in the membrane (polymer) through selection of suitable (co)monomers, and then modifying the membrane through (A) chemical reaction with
  (a) a monomeric compound containing at least two functional groups,
  (b) a polyfunctional oligomer of polymer, and
  (c) a compound containing at least one, preferably two groups capable of reaction with (b), provided that the reactive groups correspond to the formulae —R$_1$NH$_2$, —R$_2$OH or —R$_2$SH, wherein —R$_1$— is a valence bond, —C$_m$H$_{2m}$—, —(CH$_2$)$_{\overline{q}}$NH(CH$_2$)$_{\overline{2\text{-}6}}$, —(CH$_2$)$_{\overline{q}}$O—(CH$_2$)$_{\overline{2\text{-}6}}$,

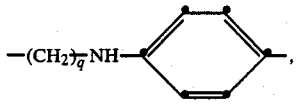

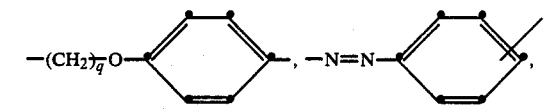

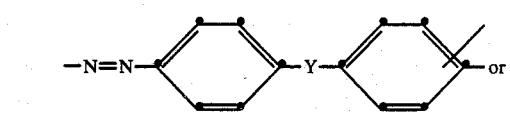

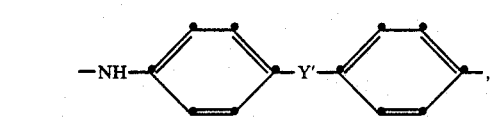

—R$_2$— is a valence bond, —C$_m$H$_{2m}$—,

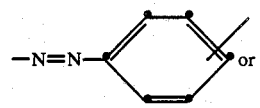

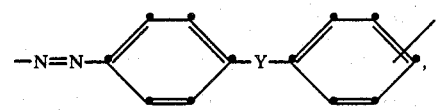

Y is a valence bond, —O— or —NH—, Y' is —O—, —S—, —SO$_2$ or

m is an integer of 1 to 6 and q is zero or 1, (B) through chemical reaction with components (b) and (c), provided that the reactive groups correspond to the formulae —R$_3$X, —R$_4$CHO, —NCO or —NCS, wherein —R$_3$— is a valence bond to an aliphatic residue or —C$_m$H$_{2m}$—, —R$_4$— is a valence bond or —C$_n$H$_{2n}$—, X is halogen, m is an integer of 1 to 6 and n is an integer of 1 to 5, or (C) through chemical reaction with hydroxylamine and components (a), (b) and (c), provided that the reactive group corresponds to the formula —R$_4$CN, wherein —R$_4$— has the indicated meaning, the degree of reactive groups in the polymers being 0.05, preferably 0.3 to 3.5 milliequivalents/g, and optionally separating the membrane from the (porous) support.

If the reactive (modifiable) groups are not already present in the polymer then they can be introduced into the polymer according to known and common chemical methods.

For instance, the radicals —$R_1NH_2$, —$R_2OH$ or —$R_2SH$, wherein $R_1$ and $R_2$ have the indicated meanings, except being a valence bond, can be obtained by haloalkylating the aromatic groups of the polymers, followed by a reaction with ammonia or amines, alkali-metal hydroxides or alkali metal hydrosulfides; the radicals —$R_3X$ and —$R_4CHO$, wherein $R_3$ and $R_4$ have the indicated meanings, are obtained by haloalkylating (see above) and optionally further reaction with alkaline compounds, e.g. alkali metal hydroxides; radical —$R_4CN$ is obtained by haloalkylating (see above) ($R_4$ being no valence bond) and further reaction with a cyano compound, such as an alkali metal cyanide.

On the other hand the reactive groups can be present on the starting membrane to be modified in order to get the inventive membranes. Such reactive groups may be e.g. vinyl or oxirane groups and preferably amino, hydroxyl, mercapto, aldehyde, cyano, cyanate or iso-cyanate groups or halogen atoms which may be attached as substituents to the polymer, or are present within the backbone itself. The reactive groups may be incorporated into the polymer by the polymerization of monomers already containing the said groups, or may be derived by chemical reactions on the formed polymer. As an example of the latter, halomethyl groups may be readily formed on aromatic polymers (U.S. Pat. No. 4,029,582), said halomethyl group may then be further converted by well known procedures to: —$CH_2NH_2$, —$CH_2NH(CH_2)_{2-6}NH_2$, —$CH_2O(CH_2)_{2-6}NH_2$,

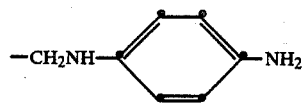

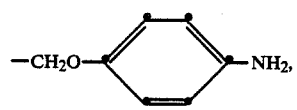

—$CH_2OH$, —$CH_2SH$, —$CHO$, —$CH_2CN$, —$CH_2OR_aOH$, wherein $R_a$ is alkylene ($C_2$-$C_6$) or phenylene.

The range of functional group concentrations in the membranes is a function of the synthetic procedure that introduces the said group, and its effect on membrane formation and properties (e.g. water solubility or brittleness). For example, the —$CH_2Cl$ function may be introduced over the range of 0.3 to 3.5 meq/g, while amino functions above 2.0 meq/g (0.3 to 2 meq/g as preferred range) form weak swellable membranes, and their polymers are difficult to dissolve. An alternative method for introducing a high concentration of amine functions on the membrane's surface and pores, is the formation of a membrane with a high chloromethyl content (2.5 meq/g), and the conversion of the chloro to amine functions on the preformed membrane. If difunctional or multifunctional amines are used then the membrane is also crosslinked. Cyanomethylated functions introduced by $CN^\ominus$ nucleophilic displacement of $Cl^\ominus$ in —$CH_2Cl$ gives a brittle membrane when the capacity of $CN^\ominus$ is above 1.5 meq/g (suitable range of 0.3 to 1.5 meq/g). If however, the reaction is carried out only on the surface and in the pores of a preformed membrane, the problem of brittleness is decreased. The aldehyde groups can be introduced by treating a chloromethylated polysulfone in dimethylsulfoxide with $NaHCO_3$ at high temperatures (140° C.), extracting the reaction mixture with $CHCl_3$ and reprecipitating the polymer in water (J. M. Frechet, C. Schuerch, JACS 93, 492 (1971).

The concentration of reactive groups may be quite high if the polymer is prepared from a monomer containing the reactive group or a precursor, e.g. 0.3 to 6 meq/g. In the subsequent binding and crosslinking reaction not all the functional groups are expected to participate in the reaction. The extent of such reactions should be limited to prevent excessive crosslinking and enbrittlement.

The lower limit of functional (reactive) group capacity is determined by the minimum concentration need to crosslink the polymers and to ensure efficient binding for the subsequent reaction to the hydrophilic polymer. This varies with the particular functional group and the molecular weight of the coating polymer. In general, however, a capacity of 0.05 preferably 0.3 meq/g was found to be the minimum for modification. It is preferred, however, to have a capacity of at least 0.3 meq/g, for efficient modification (0.3 to 3.5, preferably 1.0 to 2.5 meq/g).

Membrane casting may be performed by any number of casting procedures cited in the literature (i.e. U.S. Pat. No. 4,029,582, GB Patent No. Application 2,000,720, U.S. Pat. Nos. 3,556,305, 3,615,024, 3,567,810). Thus, the polymer or its derivative, may be dissolved in a suitable solvent or mixture of solvents (for example, N-methylpyrrolidone (NMP), dimethyl sulfoxide (DMSO), dimethyl formamide (DMF), hexamethylphosphoramide, N,N-dimethylacetamide, dioxane), which may or may not contain cosolvents, partial solvents, non-solvents, salts, surfactants or electrolytes, for altering or modifying the membranes morphology and its flux and rejection properties (i.e. acetone, ethanol, methanol, formamide, water, methylethyl ketone, triethyl phosphate, $H_2SO_4$, HCl, partial esters of sugar alcohols and their ethylene oxide adducts, respectively (Tweens, Spans), sodium dodecyl sulfate (SDS), sodium dodecylbenzene sulfonate, sodium hydroxide, potassium hydroxide, potassium chloride, zinc chloride, calcium chloride, lithium nitrate, lithium chloride or magnesium perchlorate).

The casting solution may be filtered by any of the known processes (i.e. pressure filtration through microporous filters or by centrifugation), and cast on a substrate such as glass, metal, paper, plastic etc., from which it may then be removed. It is preferable, however, to cast on a porous support material from which the membrane is not removed. Such porous supports may be non-woven or woven cloths such as cellulosics, polyethylene, polypropylene, nylon, polyvinyl chloride and its copolymers, polystyrene and polyethylene terephthalate (polyesters), polyvinylidene fluoride, polytetrafluoro ethylene and glass fibers. The membrane may alternatively be formed as a hollow fiber or tubelet, not requiring a support for practical use.

The concentration of polymer in the casting solution may vary as a function of its M.W. and possible additives between 5 to 80%, but preferably between 10 and 50% and most preferred between 15 to 30%. The temperature of casting may vary from −20° to 100° C. but the preferred range is between 0°–60° C., varying as a function of the polymer, its molecular weight, and the cosolvents and additives, in the casting solution.

The polymer casting solution may be applied to the above mentioned substrates by any of the techniques well known to those practiced in the art. The wet film thickness may vary between 5 microns to 2000 microns. The preferred range being 50 microns to 800 microns and the most preferred 100 to 500 microns. The wet film and support may then be immersed immediately, or after a partial evaporation step (from 5 sec. to 48 hours) at ambient condition or elevated temperature, or vacuum or any combination thereof into a gelling bath of a non solvent. Such baths are usually fully aqueous, or contain water with a small percent of a solvent (e.g. DMF, NMP) and/or a surfactant (e.g. sodium dodecyl sulfate) at a temperature of 0° to 70° C.

An example of a commonly used gelling bath is water with 0.5% SDS at 4° C. In another mode of forming membranes, a polymer solution containing a component that may be leached out in water or another solvent, is cast and dried before immersion. After immersion, leachable material is removed resulting in a porous membrane. In a third variation, a polymer solution without any leachable materials is cast and taken to dryness, resulting in a porous membrane by virtue of the physicochemical properties of polymeric material-solvent combination or by a subsequent chemical reaction that creates pores.

All the above methods may be used to form membranes for further modification as described by this invention. This modification process has several variations but is primarily based on the following sequence that binds a polymer layer to the support membrane and crosslinks this support membrane and polymer film.

The reaction steps are the following:

(a) The reaction of a multifunctional (monomeric) reagent with functional groups (amino, hydroxyl, halogen atoms) on the membrane which may be present as substituents on a polymer backbone or as an integral part of the same said backbone. In the practice of this invention, not all the groups of the multifunctional reagent will participate in the crosslinking of membranes, and a given fraction is available for binding a hydrophilic oligomer or polymer in step (b). In one preferred embodiment of the invention (when e.g. haloalkyl or aldehyde groups are present as substituents to the polysulfone backbone), the aforementioned hydrophilic oligomer or polymer is the said multifunctional reagent, thus obviating the second step.

(b) Unreacted groups of the multifunctional reagent in step (a) are used to bind a reactive oligomer or polymer to the membrane prepared in step (a). The now bound polymer is a thin film that contains additional unreacted groups for a further reaction with e.g. non-ionics that crosslink the said polymer and/or ionics that additionally introduce charged ionic species in step (c). Functional groups binding to the membrane may or may not be the same as those reacting in the subsequent step.

(c) Ionic (anionic) or hydrophilic (non-ionic) multifunctional reagents are reacted with the functional groups of the bound oligomer or polymer in step (b) above, thus crosslinking and/or charging the said oligomer or polymer with ionic groups.

The inventive membranes are thus formed by a build-up of a bound hydrophilic oligomer or polymer or polyelectrolyte on the basic membranes' (polystyrene) surface and/or in the pores.

Compounds (a) which can be used as the multifunctional reagents are monomeric compounds which possess crosslinking properties and can enter into chemical bonding both with the (polystyrene starting) membrane (containing reactive groups) and the coating polymer (b). These compounds, which have at least two functional groups, possess their reactivity by virtue of e.g. reactive multiple bonds, epoxide groups, aziridine groups, aldehyde groups, imidate groups or isocyanate or isothiocyanate groups, further hydroxyl, anhydride, acyl halide, carbonic acid imide halide or N-methylol groups (these bonds or groups may be further substituted), or of substituents detachable as tertiary amines or preferably as anions, and combinations of these are also possible. The compounds contain, for example, the groupings

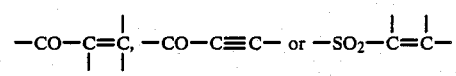

as a multiple bond to which further substituents can be added on. The isocyanate or isothiocyanate group can also be considered as a group of this type. Component (a) can contain quaternary ammonium groups, which are split off as tertiary amines, for example a trimethylammonium or pyridinium group or sulfonium groups, as the leaving groups. However, component (a) preferably contains substituents with groups that split off as an anion, and preferably containing a reactive halogen atom, as the reactive group. These leaving groups possess their reactivity by virtue of, for example, the influence of electrophilic groups, such as the —CO— or —SO₂— group in saturated aliphatic radicals. They also possess their reactivity by virtue of the influence of a quaternary nitrogen atom, such as in the group

or in aromatic radicals by virtue of the influence of electrophilic groups in the o- and p-position, for example nitro, hydrocarbonsulfonyl or hydrocarboncarbonyl groups, or of the bond to a ring carbon atoms which is adjacent to a tertiary ring nitrogen atom, as in halogenotriazine or halogenopyrimidine radicals.

Compounds (a) which have proved particularly advantageous are cyclic carbonic acid imide-halides and in particular halogeno-diazines or -triazines containing at least two reactive substituents, as well as compounds containing isocyanate or isothiocyanate groups. Tetrachloropyrimidine and in particular cyanuric chloride have proved particularly advantageous.

The cyclic carbon acid imide-halides used here in step (a) are advantageously:

(A₁) s-Triazines containing at least two identical or different halogen atoms bonded to carbon atoms, for example cyanuric chloride, cyanuric fluoride, cyanuric bromide and also primary condensation products of cyanuric fluoride or cyanuric chloride or cyanuric bromide and, for example, water, ammonia, amines, alkanols, alkylmercaptans, phenols or thiophenols;

(B₁) Pyrimidines containing at least two reactive, identical or different halogen atoms, such as 2,4,6-trichloro-, 2,4,6-trifluoro- or 2,4,6-tribromo-pyrimidine, which can be further substituted in the 5-position, for example by an alkyl, alkenyl, phenyl, carboxyl, cyano, nitro, chloromethyl, chlorovinyl, carbalkoxy, carboxymethyl, alkylsulfonyl, carbonamido or sulfonamido group, but preferably by halogen, for example chlorine, bromine or . fluorine. Particularly suitable halogenopyrimidines are 2,4,6-trichloro- and 2,4,5,6-tetrachloro-pyrimidines;

(C₁) Halogenopyrimidinecarboxylic acid halides, for example dichloropyrimidine-5- or 6-carboxylic acid chloride;

(D) 2,3-Dihalogeno-quinoxaline-, -quinazoline- or -phthalazine-carboxylic acid halides or -sulfonic acid halides, such as 2,3-dichloroquinoxaline-6-carboxylic acid chloride or acid bromide;

(E) 2-Halogeno-benzthiazole- or -benzoxazole-carboxylic acid halides or -sulfonic acid halides, such as 2-chloro-benzthiazole- or -benzoxazole-5- or 6-carboxylic acid chloride or -5- or -6-sulfonic acid chloride; and (F) Halogeno-6-pyridazonyl-1-alkanoyl halides or 1-benzoyl halides, for example 4,5-dichloro-6-pyridazonyl-1-propionyl chloride or -1-benzoyl chloride.

Further compounds which contain at least two reactive substituents and can be employed are, for example:

(G) Anhydrides or halides of aliphatic, α,β-unsaturated mono- or di-carboxylic acids having preferably 3 to 5 carbon atoms, such as maleic anhydride, acryloyl chloride, methacryloyl chloride and propionyl chloride;

(H) Anhydrides or halides of aliphatic mono- or dicarboxylic acids having preferably 3 to 10 carbon atoms, or of aromatic carboxylic acids, containing reactive halogen atoms, for example chloroacetyl chloride, β-chloropropionyl chloride, α,β-dibromopropionyl chloride, α-chloro- or β-chloro-acryloyl chloride, chloromaleic anhydride and β-chloro-crotonoyl chloride, and fluoro-nitro- or chloro-nitro-benzoic acid halides or -sulfonic acid halides in which the fluorine atom or the chlorine atom is in the o-position and/or p-position relative to the nitro group;

(I) Carboxylic acid N-methylolamides or reactive functional derivatives of these methylol compounds. Carboxylic acid N-methylolamides are in particular N-methylol-chloroacetamide, N-methylolbromoacetamide, N-methylol-α,β-dichloro- or -dibromo-propionamide, N-methylol-acrylamide and N-methylol-α-chloro- or -α-bromo-acrylamide. Reactive derivatives of the carboxylic acid N-methylolamides are for example, the corresponding N-chloromethyl- or n-bromomethyl-amides;

(J) Free or etherified N-methylolureas or N-methylolmelamines, for example N,N-dimethylolurea, N,N-dimethylolurea dimethyl ether, N,N'-dimethylolethylene- or -propylene-urea, 4,5-dihydroxy-N,N'-di-methylolethyleneurea or 4,5-dihydroxy-N,N'-di-methylolethyleneurea dimethyl ether and di- to -hexamethylolmelamine, trimethylolmelamine dimethyl ether, pentamethylolmelamine di- or -trimethyl ether and hexamethylolmelamine pentamethyl or hexamethyl ether;

(K) Condensation products of diarylalkanes containing at least one phenolic hydroxyl group and halogenohydrins, for example the diepoxide obtained from 2,2-bis-(4'-hydroxyphenyl)-propane and epichlorohydrin, as well as glycerol triglycidyl ethers and also corresponding diaziridines;

(L) Di-aldehydes, for example glutaraldehyde or adipaldehyde;

(M) Diisocyanoates or diisothiocyanates, such as alkylene ($C_2$-$C_4$) diisocyanate, e.g. ethylene diisocyanate, phenylene- or alkyl-($C_1$-$C_4$)-substituted phenylenediisocyanates, e.g. phenylene-1,4-diisocyanate or toluene-2,4-diisocyanate, or phenylene-diisothiocyanates, for example phenylene-1,4-diisothiocyanate; or (N) Further reactive compounds, such as trisacryloyl-hexahydro-s-triazine, epoxides or aziridines.

Hydrophilic oligomers or polymers are used in step (b) to react and to coat the membrane substrate. The preferred components (b) are polyfunctional aliphatic or aromatic oligomers or polymers which contain amino groups which can be primary, secondary or tertiary. Or alternatively, but less preferred, they may be polymers with hydroxyl or thio-functions. The aliphatic oligomers or polymers can be acyclic or cyclic ones. Examples of such polymers are polyethyleneimines (M.W. 150–2000,000) which can be partially alkylated (e.g. with methyliodide) or otherwise modified, polyvinylamines (M.W. 1000 to 2,000,000), polyvinyl alcohols (M.W. of 2,000 to 200,000) or partially esterified polyvinyl alcohols, cellulosics, such as e.g. ethyl cellulose, carboxymethyl cellulose, hydroxymethyl- or hydroxyethylcellulose, polyvinylanilines, (M.W. 200 to 2000,000), polybenzylamines, polyvinylmercaptans, polymers of 2-hydroxyethyl or 2-aminoethyl-methycrylates, polyvinylimidazolines, amino modified polyepihalohydrin (described in GB Pat. No. 1,558,807), polydiallylamine derivatives and polymers containing piperidine rings (described in GB Pat. No. 2,027,614A), condensation products of dicyandiamide, formaldehyde and ammonium chloride (U.S. Pat. No. 3 290 210), amino polysulphones, amino polyarylene oxide (e.g. amino methylated polyphenylene oxide), polyamidopolyamine-epichlorohydrin condensation products, and hydrophilic amines containing polymers (described in EP Application No. 8,945). The above polymers may be in part a copolymer or a polymer containing other monomeric units, block polymers or graft polymers. If they are copolymers the other monomeric units may or may not contain ionic groups ($-SO_3^\ominus$, $-COO^\ominus$, $-N^\oplus R_3$).

Examples are the copolymers of styrene sulfonate (sodium salt)/vinyl aniline, 2-aminoethyl-methacrylate/acrylic acid, vinyl aniline/vinyl trimethylammonium chloride or vinylamine/vinylsulfonate.

The preferred polymers are polyvinyl alcohols, cellulosics, polyvinylamines or -anilines and especially poly aliphatic (acylic or cyclic) amines. Polyethyleneimine is an example of this group. The range of molecular weights may be between 150 (189) to 2,000,000, but preferably between 1000 and 200,000 and most preferred 10,000–70,000. Low molecular weight polymers or oligomers (150 to 1000) may be used but the increase in solute rejection of the final membrane is not as great when higher molecular weight polymers are used. Polymers with molecular weights above 100,000 result in very viscous solutions and are difficult to apply.

The thin deposited film (obtained after step (b)) is crosslinked in step (c) and/or charged with a multifunctional reagent. The function of these reagents is to crosslink the thin layer and if the reagent is ionic, charges are also incorporated. These reagents may be the same as used in step (a). Preferably they are ionic ones which optionally can be used together with non-ionics, too. Suitable ionic groups in compound (c) (and afterwards in the membrane) are e.g. sulfate groups or sulfonic acid groups, further carboxyl groups, ammonium groups containing hydrogen atoms ($-NH_4^{\oplus}$) or derived from primary, secondary or tertiary amines (containing 1,2 or 3 substituents different from hydrogen), as well as quaternary ammonium, phosphonium or sulfonium groups. Of special interest are components (c) containing sulfonic acid groups. If the thin layer is monomolecular, then the function of crosslinking is not necessary and the primary importance of the reagent is the introduction of charged or ionic groups.

If the coating polymer is a copolymer containing ionic groups (e.g. poly(vinylamine/vinylsulfonate) then it is preferred that the multifunctional group is non-ionic.

In the preferred embodiment, ionic multifunctional reagents were found to give membranes with relatively high flux concomitant with a high rejection. In another variation, the multifunctional reagents are hydrophilic or partially water soluble. In this case they function simply to crosslink the adsorbed or coated layers.

Unlike the state of the art practiced in the fabrication of composite UF/RO membranes, the crosslinking (and charging step) is preferably carried out in an aqueous solution. Thus, water soluble multifunctional reagents are found to give good results. The preferred reagents in this group are ionic or charged derivatives of triazinyl or pyrimidinyl compounds. Reactive azo dyes (containing sulfonic acid groups, carboxyl groups or ammonium groups) belong to this class as do non colored compounds with the aforementioned functions. An effective reagent may crosslink via chemical bonds, electrostatic interactions of ionic groups, and by chelation or coordination of polymeric functions with metal ions. The preferred mode of crosslinking is via a covalent bond, though the other two modes may also be used. In some cases all three modes of crosslinking may be operative. One or more components can be used for cross-linking (e.g. a reactive dyestuff and a metal salt- copper sulfate).

Included within the scope of this invention are also hydrophilic multifunctional (non-ionic colorless) reagents such as low molecular weight difunctional epoxides, aziridines, anhydrides, and preferably a cyclic carbonic acid imide halides (cyanuric chloride or tetrachloropyrimidine), dihalides of dicarboxylic acides or dialdehydes. While many of the above reagents can be applied in aqueous solutions within a narrow range of pH and temperature, the acyl halides must be dissolved in aprotic solvents.

The reactive dyes, which can belong to various categories, for example anthraquinone, formazan or preferably azo dyes which are optionally metal complexes. Suitable reactive groups (which are part of the dyes) are the following: carboxylic acid halide groups, sulfonic acid halide groups, radicals of $\alpha,\beta$-unsaturated carboxylic acids or amides, for example of acrylic acid, methacrylic acid, $\alpha$-chloroacrylic acid, $\alpha$-bromoacrylic acid or acrylamide radicals of preferably low halogenoalkyl-carboxylic acids, for example of chloroacetic acid, $\alpha,\beta$-dichloropropionic acid or $\alpha,\beta$-dibromopropionic acid; radicals or fluorocyclobutanecarboxylic acids, for example of tri- or tetra-fluorocyclobutanecarboxylic acid; radicals containing vinylacyl groups, for example vinylsulfone groups or carboxyvinyl groups; radicals containing ethylsulfonyl ($-SO_2CH_2CH_2OSO_2OH$, $-SO_2CH_2CH_2Cl$) or ethylamino sulfonyl groups ($-SO_2NHCH_2CH_2OSO_2OH$) and halogenated heterocyclic radicals such as dihaloquinoxalines, dihalopyridazonyl, dihalophthalazines, halobenzothiazoles and preferably halogenated pyrimidines or 1,3,5-triazines such as monohalotriazines, dihalotriazines, 2,4-dihalopyrimidines or 2,4,6-trihalopyrimidines. Suitable halogen atoms are fluorine, bromine and especially chlorine atoms.

Examples of reactive groups present in component (c) are monochlorotriazinyl, dichlorotriazinyl, 2,4-dichloropyrimidinyl, 2,3-dichloroquinoxaline-6-carbonyl, 4,5-dichloro-pyridazonylpropionyl, 1,4-dichlorophthalazine-6-carbonyl, chlorobenzothiazole linked to the dye via $-COHN$, $-SO_2NH-$, $-NH-Ar-N=N-$ (Ar=phenylene or naphthylene), 5-chloro-4-methyl-2-methylsulfonyl pyrimidinyl, vinylsulfonyl, $\beta$-sulfato ethylsulfonyl, $\beta$-sulfatoethyl aminosulfonyl, $\beta$-chloroethylsulfonyl or $\beta$-sulfatopropionamido.

Mostly preferred components (c) are reactive azo dyestuffs containing sulfonic acid ($-SO_3H$) or carboxyl ($-COOH$) groups (either group may be also present in salt form, such as alkali metal salt (sodium salt) and as reactive groups monochlorotriazinyl, dichlorotriazinyl, 2,4-dichloropyrimidinyl, vinyl sulfonyl, $\beta$-sulfatoethylsulfonyl, $\beta$-chloroethylsulfonyl or $\beta$-sulfatoethylaminosulfonyl radicals.

The membranes which contain at least at the membrane surface an oligomer or polymer (introduced according to step (b)) modified by an azo dye containing sulfonic acid groups are particularly valuable and versatile in use. The azo dye can also contain a metal, for example copper, bonded as a complex.

For the reaction of a polystyrene membrane (containing e.g. hydroxyl or amino groups) in step (a) with a multifunctional organic compound it is treated, when e.g. cyanuric chloride is used, with an aqueous (aqueous-organic [acetone]) solution (suspension) of this reagent which (solution) can contain 0.5 to 5 parts of cyanuric chloride per part of membrane. The reaction temperature should be kept below 4° C., for example at 0° C., in order to prevent hydrolysis of the cyanuric chloride; the pH value range is approximately between 8 and 11 and the reaction time can be from 5 minutes to 5 hours.

A polystyrene starting membrane containing cyano groups can be modified by treating for 2 to 60 minutes at temperatures of about 55° to 75° C. with an aqueous solution of hydroxylamine (2 to 15%), which has a pH value of 2 to 11 and preferably of 6 to 7 (for example adjusted with sodium carbonate). The membrane treated in this way is then removed from the reaction solution and placed in an aqueous solution (suspension) of the (multifunctional) organic compound (a) as described before.

Further modification of these membranes (steps (b), (c)) as well as the modification of polystyrene starting membranes containing haloalkyl or aldehyde groups are described in the following chapters.

The sequence of binding the oligomer or polymer(-film) to the basic membrane (step (b)) is a function of the groups involved. The introduction of halomethyl groups into a polystyrene backbone is readily achieved. In particular chloromethylation of aromatic groups is well documented (U.S. Pat. No. 4,029,582). The binding of hydrophilic polymers containing amines, or hydroxyl groups can occur via a nucleophilic displacement of the haloatom on the polystyrene membrane. Both binding to and crosslinking of the support occur at this stage. Different catalysts, and solvent combinations may be employed to enhance the reaction. For example polystyrene in N-methylpyrrolidone is cast on a support and immersed immediately in ice water. The membrane, after leaching is placed in an aqueous bath of polyethyleneimine (PEI) (M.W. 30,000) containing 1% potassium iodide at 50° C. for 5 minutes. The membrane is found to be crosslinked and contains a bound layer of PEI for further reaction. Membranes containing aldehyde functions can be modified in an analogous way.

Polystyrene membranes containing aldehyde groups can be modified analogously.

Polystyrene membranes with an amino, hydroxy, or amidoxime group (as alkyl and/or aryl substituents or within the backbone) require in most cases an additional reaction with a multifunctional reagent prior to binding with an amine or hydroxy polymer. This multifunctional reagent reacts with the functional group on the membrane, crosslinking the membrane, and then through unreacted groups reacts with the amine or hydroxyl groups of the said hydrophilic polymer.

In another variation of the invention, the functional groups on the membrane may be converted to different groups and then reacted with the coating polymer or to a multifunctional reagent and then to the said polymer. An example of the latter is the nitrile function. The nitrile function may be reduced to amines or reacted with hydroxylamine to amidoximes. Both the amine and the amidoxime may be further reacted with a multifunctional reagent and then the polymer. An example of the former sequence are aryl methyl groups. Halo radicals may be introduced into the methyl portion using N-halosuccinimide and a free radical source. The resultant halomethyl may be reacted directly with the coating polymer (b).

Water is the preferred solvent for the reaction of component (b), though other solvents such as low molecular weight alcohols or ketones may be used alone or in combination with water. The range of polymer concentration may be from 0.1 to 100%, but preferably between 1 and 30% and most preferred between 5 and 15%. The concentration of polymer needed to achieve optium rejection/flux characteristics is a function of the reactive groups involved, the temperature, time of immersion, and pH. These factors (together with a rinse step after immersion) control the extent of binding and the thickness of the polymer layer deposited on the membrane. The temperature of the polymer solution during membrane immersion may vary from 0° to 90° C. The optimum temperature is a function of the reaction kinetics of the reactants. For example, the reaction of chloromethylated polystyrene with PEI may require a temperature of 30° C. for 5 minutes while the binding reactions between chlorotriazinyl groups and PEI is carried out at 25° C. for 30 minutes.

The time of immersion may vary between 1 minute to 48 hours as a function of the temperature, pH, concentration and reactants. For example, at a pH of 8.5 and a temperature of 25° C., a chloromethylated polystyrene membrane (2.0 meq/g) should be immersed between 2 to 12 hours in 10% PEI (M.W. 30,000) to give high rejections and fluxes. On the other hand an amine containing polymer, after having been reacted with a multifunctional reagent such as cyanuric chloride, need only be immersed in a 10% PEI solution at 0° to 4° C. for 5-30 minutes to achieve a high rejection.

The pH of the polymer solution may be adjusted to control the solubility of the polymer, the rate of reaction of the polymer to substrate and the quantity of polymer adsorbed to the surface. Thus, for amines, a pH above 7.0 increases nucleophilic reaction rates, and for membrane modifications a pH range of 7.0 to 10.0 was found to be optimum in most cases, though higher or lower pH's could also be used. If more acidic pH's are used to improve the solubility of the coating polymer, a given time is allowed for adsorption of the polymer to the membrane and then the pH is increased above 7.0 for binding. pH's above 12 are not desirable as they may promote hydrolysis of the functional groups on the membrane.

After immersion the coated membrane is rinsed in water to remove excess oligomer/polymer. The time of rinsing may vary from one minute to 48 hours, but most preferable from 30 minutes to 4 hours. Excessive washing or rinsing results in membranes with lower than maximum rejection but still higher than the unmodified membrane. Shorter rinsing times leave a relatively thick deposit of polymer and result in relatively low fluxes. The pH and temperature of the rinsing solution may vary between 1.0 and 10, and 0° to 70° C. respectively. Shorter rinsing times are required at the higher temperature and low pH's (1-3). The rinsing solutions may contain (e.g. in order to reduce the rinsing time) nonionic or anionic surfactants and/or also salts, such as sodium carbonate or sodium sulfate.

In the aforementioned list of components (a) and (b), it is not expected that every compound or radical of (b) will react with every component (a). For example, functional groups of compound (b), containing alkyl amine groups, are generally more reactive than aromatic amino or hydroxyl groups. Likewise, polymeric or oligomeric isocyanate or thioisocyanate (b) will not react with identical groups in (a), but must be chosen with such radicals of (a) where a reaction is possible (e.g. methylol or amino or hydroxyl containing radicals of (a) will react with isocyanate functions of (b)).

The reaction step (c) serves to optionally introduce positive or negative charges (ionic groupings) into the membrane surface and/or the pores and/or crosslink the membrane and is effected in one or two stages.

The one-stage process means that the compound carrying the charge and the so-called fixing agent (for example alkali) are used in one bath.

The two-stage process comprises first the step involving the adsorbtion of the compound carrying the charge and then, in a separate reaction solution, the fixing step (chemical reaction between component (c) and the (modified) membrane). The two-stage process is preferred since, on the one hand, the concentration of component (c) in the adsorption solution can be kept lower and a solution of this type can optionally be used several times and, on the other hand, the total reaction time is shorter than in the case of the one-stage process.

In the two-stage process, the concentration of e.g. a reactive dye (component (c)) in aqueous solution can be about 0.5 to 3%; the adsorption is carried out, for example, at temperatures of 20° to 35° C. over a period of 2 to 60 minutes, the pH value can be 4 to 8. Fixing can then be carried out in an aqueous solution, the pH of which has been adjusted to 9 to 12, and the reaction time can be about 30 minutes. The pH is adjusted to the desired value using any desired inorganic (sodium carbonate) or organic bases.

Furthermore, it is also possible to introduce the charged groups into the membrane by reacting reagents, such as alkyl halides or benzyl halides, with an amino group of the oligomer/polymer chain. In this way, for example, the polyethyleneimine radical can be modified by methyl iodide or dimethyl sulfate. On the other hand, the modification can also be effected with chlorosulfonic acid itself.

Depending on the intended application, the membranes can be in various forms, for example in the form of sheets, leaves or tubes, or in the form of a pocket, bag, cone or of hollow fibres. When subjected to severe pressure, the membranes can, of course, be protected by non-woven supports, supports made of textile fibres or paper, wire screens or perforated plates and tubes (modules). Within the range indicated further above, the pore size can be varied by means of different temperatures and can likewise be suited to the particular application. Thus, for example, by subjecting the membranes to heat treatment (e.g. 50° to 140° C.) before or after their chemical modification it is possible to change the pore size and thus the flux and the rejection of the membranes.

Compared with known modified membranes, the inventive membranes show the following advantages:

Improved rejection for charged ionic substances, especially ionic substances having a multiple charge, in an aqueous solution.

An increase in the difference between the rejection for ions with a multiple charge and the rejection for monovalent ions in aqueous solutions.

An improvement in the efficiency of the separation (concentration) of charged ions, especially ions having a multiple charge, from the solvent (water); improved flux for water;

An improvement in the efficiency when separating dissolved substances with a multiple charge from dissolved substances with a single charge.

An improvement in the efficiency of the separation of low-molecular dissolved substances from high-molecular dissolved substances, both the low-molecular and the high-molecular substances being monovalent and having the same charge (positive or negative).

Possibility for use at pH values of up to 12, preferably 2 to 12 and temperatures of up to 80° C., preferably between room temperature (15° to 20° C.) and 60° C.

Improvement in solvent resistance to the extent that the membrane is no longer soluble in usual solvents (e.g. N,N-dimethyl-formamide).

Improved resistance to high pressure (good stability). Pressures between about 2 and 100 bars, preferably 2 and 50 (30) bars.

The following applications in particular are advantageous for the membranes according to the invention and, in principle, these applications always concern the separation of monovalent ions of low ionic weight from polyvalent ions of low or relatively high ionic weight or from monovalent ions of relatively high ionic weight, or the separation of ionic substances from non-ionic substances or of ionic compounds of different molecular weights or of opposite charge.

1. The separation of organic and metal-organic ionic substances from by-products from a reaction mixture and other substance which are contained therein, for example from salts, such as sodium chloride, sodium sulfate or sodium acetate.

2. The separation of heavy metal complexes from those salts which do not form complexes (treatment of effluents).

3. The purification of effluents which are obtained from the production and use of dyes and fluorescent brighteners.

4. The separation of proteins or hormones which have similar molecular weights but are of opposite charge.

5. The separation of ionic surfactants (detergents, wetting agents or dispersants) from other chemicals which are still present in the reaction mixture after the preparation of the surfactants (by-products, excess starting materials).

6. The removal of ionic surfactants from effluents.

7. The separation of ionic molecules (salts) form aqueous solution, i.e. the concentration of aqueous solutions which contain metal complexes, surfactants, dyes or proteins, the results obtained in this case being better, with regard to the efficiency (permeability (flux) per unit time) and the separating effect, than those obtained with known membranes.

8. The separation of compound of opposite charge or of charged compounds from those with no charge.

The processes for separating the substances (and this is another subject of the present invention) comprise in general directing aqueous solutions of mixtures of substances under pressure (reverse osmosis) through a semipermeable membrane as described hereinbefore. More particularly, processes for concentrating and/or purifying liquids or separating components dissolved in these liquids are involved which comprise disposing on one side of an inventive semipermeable membrane a solution with a solute and applying a hydraulic pressure against said solution and said membrane, said pressure being greater than the osmotic pressure of said solution.

The separation effect (the rejection) of the membranes can be measured as follows: A circular membrane with a surface area of 13 cm$^2$ lieing upon a fine mesh wire net made of stainless steel, is inserted into a cylindric cell of stainless steel. 50 ml of the solution to be investigated, containing the test substance in a concentration $c_1$ (g substance in g solution) is put on the membrane in the steel cylinder and subjected to a nitrogen pressure of 30 bars. The solution is stirred magnetically. The solution on the exit side of the membrane is examined for the concentration of the test substance $c_2$ by withdrawing three samples of 5 ml each from the start of the experiment. The rejection can be calculated from the following equation:

$$R = \frac{c_1 - c_2}{c_1} \cdot 100 \, (\%)$$

The flux (F), in effect the volume of material permeating though the membrane per unit of surface area and time is:

$$F = V \cdot A^{-1} \cdot t^{-1}$$

where:
F = flux
V = volume
A = membrane surface area
t = time.

The flux (F) may be expressed in m$^3$/m$^2$·d, that is cubic meters per square meter per day or, alternatively 1/m².h (i.e. liters per square meter of membrane per hour).

In addition to the measurement of flat membranes described above, 60 cm membrane tubes with an outer diameter of 1.4 cm were investigated. The said tubular membranes are placed in a perforated stainless steel holder of outer diameter of 2.0 cm and inner diameter of 1.40 cm, and this is placed in a polycarbonate tube of inner diameter of 2.75 cm. The feed pressurized at 30 bars is introduced into the supported tubular membranes at a circulating rate of approximately 14.75 l/min.

The stream permeates under these conditions through the tubular membrane supported by the perforated stainless steel tube to the permeate side. The calculation of rejection (R) and flux (F) is the same as for flat membranes.

Parts and percentages in the following examples relate to weight—if not indicated otherwise.

In the following examples, the dyes and colourless compounds of formulae (101) to (107) are used as reactive agents for crosslinking and charging the adsorbed polymer layer, while the dyes of formulae (108) to (110) are used in test solutions.

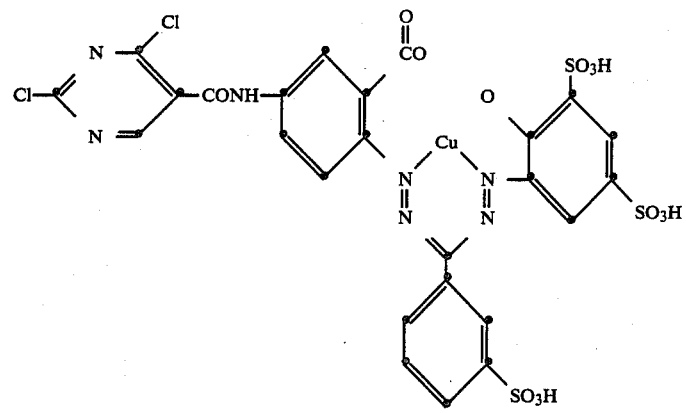
(101)

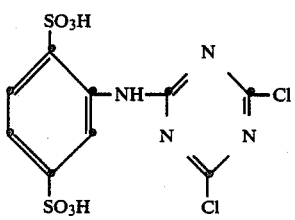
(102a)

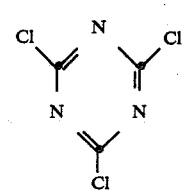
(102b)

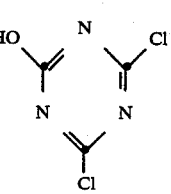
(102c)

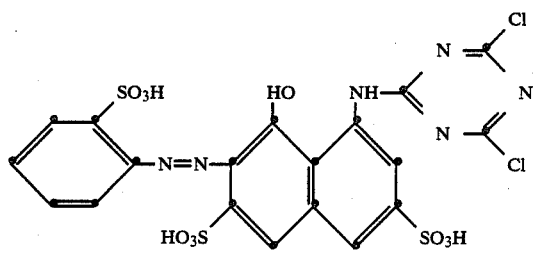
(103)

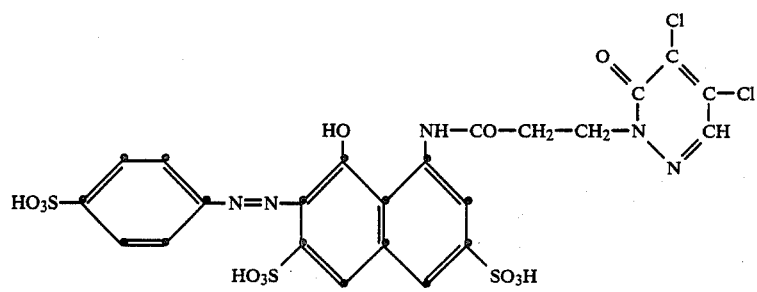
(104)

(105)
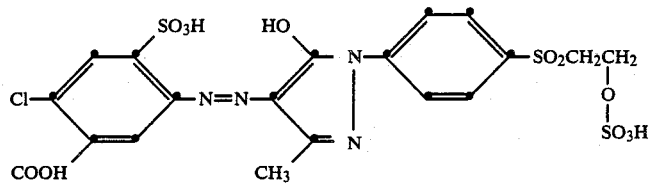
(106)
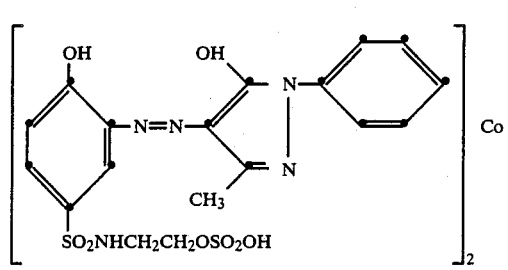
(107)
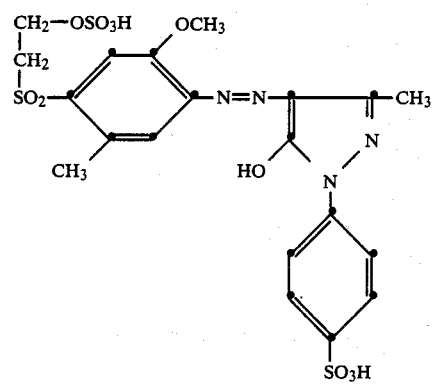
(108)
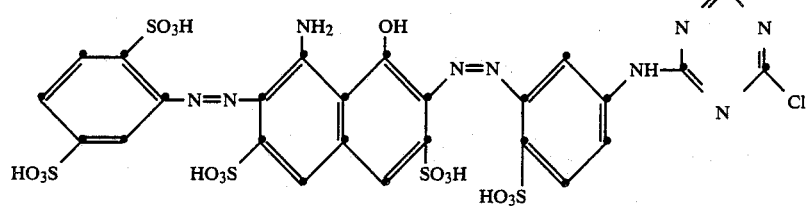
(109)
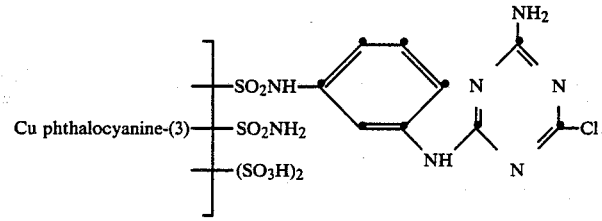
(110)
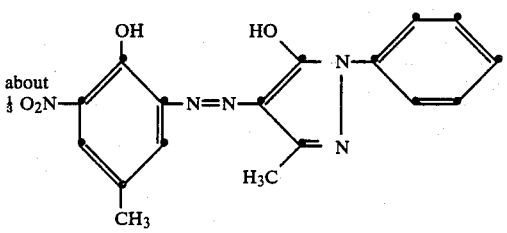
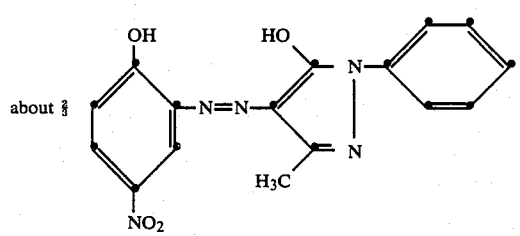

(2:1 chromium complex)

EXAMPLE 1

A copolymer of the following repeating units was synthesized by terpolymerization of styrene, chloromethylated styrene and acrylonitrile:

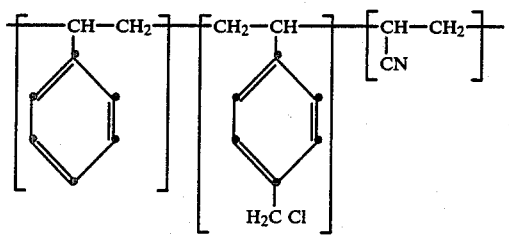

The chloro content is 1.2 meq/g and the ratio of the styrene species to acrylonitrile is 75:25. The number average molecular weight is 39.000.

A 16% N-methyl-pyrrolidone solution of the polymer was filtered and cast 0.2 mm thick (wet thickness) on a polyester non-woven and immersed immediately in an aqueous 0.5% sodium dodecyl sulfonate solution at 4° C. After leaching for 24 hours in deionized water the membrane is modified by immersion in a 10% aqueous solution of polyethyleneimine at room temperature for 1 hour at 50° C., washing with tap water for 2 hours and then placing in a bath containing 1% of the reactive dye of formula (101) and 10% of sodium chloride for 15 minutes, drip drying for 10 seconds and immersion in a 2% $Na_2CO_3$ bath for 30 minutes at room temperature. The resultant membrane is insoluble in N-methyl-pyrrolidone and dimethylformamide, indicating crosslinking. The flux and rejection of the membrane before and after modification is given in Table 1.

TABLE 1

| Solute | concentration % | Before Modification Rejection % | Before Modification Flux l/m²·h | After Modification Rejection % | After Modification Flux l/m²·h |
|---|---|---|---|---|---|
| Dye of formula (108) | 0.15 | 85 | 62 | 98 | 34 |
| Congo Red | 1.0 | 90 | 51 | 99.5 | 42 |
| Toluene Sulfonic acid | 1.0 | 27 | 42 | 34 | 50 |
| NaCl | 1.0 | 15 | 36 | 25 | 54 |

Testing conditions: pH-value 7.0; 25° C.; 20 bars.

EXAMPLE 2

To a solution of 5 g Poly(Styrene/Acrylonitrile) (75/25) in 250 ml methylene chloride, 20 ml chloromethyl ether and 0.5 ml $SnCl_4$ were added. The solution was refluxed for 5 hours and then cooled to room temperature, and poured in 600 ml of methanol. The precipitated polymer was filtered out, redissolved in DMF and precipitated in water. A chloromethylated polymer is obtained with 1.6 meg/g chlorine content.

A membrane of the above polymer was fabricated and modified as described in Example 1 with the exception that the polyethyleneimine step was carried out at room temperature for 5 minutes. The results are given in Table 2.

EXAMPLE 3

A styrene-vinylidene chloride copolymer (2.12 styrene to 1 vinylidene chloride) was chloromethylated with the following procedure: 2.5 g of the polymer was dissolved in 20 ml of $CS_2$ with the addition of $ClCH_2OCH_3$ (2.5 ml) and 1 g $AlCl_3$ and reacted with 8 hours at room temperature. The polymer was precipitated in methanol, redissolved in DMF and reprecipitated in water. The degree of chloromethylation was 1.3 meq/g. A membrane was cast and modified as in Example 2. The results are given in Table 2.

EXAMPLE 4

10 g of the copolymer of Example 2 was dissolved in 200 ml of benzene to which 10 g of N-Bromosuccinimide was added with 0.5 g benzoyl peroxide. The solution was heated for 4 hours, filtered and the polymer precipitated in methanol. The resultant polymer had a Br content of 0.8 meq/g. The NMR-spectrum indicated the following structure:

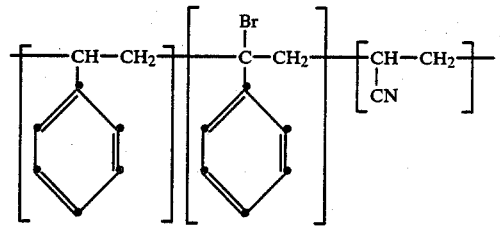

A membrane was cast and modified as in Example 1. The results are given in Table 2.

TABLE 2

| | Membrane Properties after Modification to Dye of Formula (108) (1500 ppm, 20 bar), pH-value 7.5 | |
|---|---|---|
| Membrane Example No. | Rejection (%) | Flux (l/m²·h) |
| 2 | 97.1 | 34 |
| 3 | 99.6 | 82 |
| 4 | 94.5 | 112 |

I claim:

1. A semipermeable membrane of a styrene polymer having a reactive group, directly attached to a phenyl ring of said styrene polymer, which is
   (A) modified through a sequence of chemical reactions consisting essentially of steps (a) to (c), wherein
   step (a) is reacting said reactive group with a monomeric compound containing at least two functional groups, at least one of which being capable of reacting with the reactive group containing styrene polymer to introduce said monomeric compound into said styrene polymer,
   step (b) is reacting a product of step (a) with a polyfunctional oligomer or polymer having a plurality of functional groups to bond them to available functional groups of the product of step (a) and thereby introduce said polyfunctional oligomer or polymer into said product of step (a), and step (c) is reacting a product of step (b) with a compound containing two functional groups capable of reacting with said product of step (b), to bond them to available functional groups of the product of step (b), and thereby introduce said compound containing two functional groups into said product of step (b), provided that said reactive group corresponds to the formula —R$_1$NH$_2$, —R$_2$OH or —R$_2$SH, wherein —R$_1$— is a valence bond, —C$_m$H$_{2m}$—, —(CH$_2$)$_q$NH(CH$_2$)$_{2-6}$, —(CH$_2$)$_q$O—(CH$_2$)$_{2-6}$,

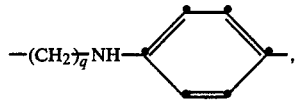

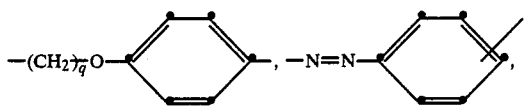

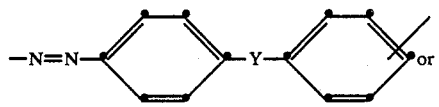

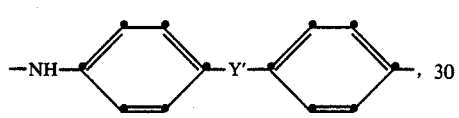

—R$_2$— is a valence bond, —C$_m$H$_{2m}$—,

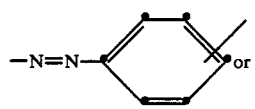

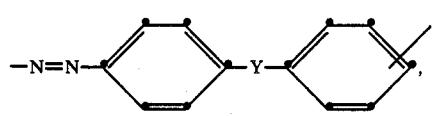

Y is a valence bond, —O— or —NH—, Y' is —O—, —S—, —SO$_2$ or

m is an integer of 1 to 6 and q is zero or 1, or (B) modified through a sequence of chemical reactions consisting essentially of steps (b) and (c), wherein step (b) is reacting said reactive group with said polyfunctional oligomer or polymer having said plurality of functional groups to bond them to said reactive group and thereby introduce said polyfunctional oligomer or polymer into said styrene polymer, and step (c) is as defined above, provided that said reactive group corresponds to the formula —R$_3$X, —R$_4$CHO, —NCO or —NCS, wherein —R$_3$— is a valence bond to an aliphatic residue or —C$_m$H$_{2m}$—, —R$_4$— is a valence bond or —C$_n$H$_{2n}$—, X is halogen, m is an integer of 1 to 6 and n is an integer of 1 to 5, or (C) modified through a sequence of chemical reactions consisting essentially of reacting said reactive group with hydroxylamine to form a reaction product containing an amidoxime group, followed by steps (a) to (c), wherein step (a) is reacting said reaction product containing said amidoxime group with said monomeric compound containing said at least two functional groups, at least one of which being capable of reacting with said amidoxime group, to bond one of the functional groups to said amidoxime group and thereby introduce said monomeric compound into said reaction product, and steps (b) and (c) are as defined above, provided that said reactive group corresponds to the formula —R$_4$CN, wherein —R$_4$— is as defined above, the degree of substitution of reactive groups in said styrene polymer being 0.05 to 3.5 milliequivalents/g.

2. A membrane according to claim 1, wherein the reactive group containing styrene polymers are polystyrenes, copolymers of styrene and ethylenically unsaturated comonomers, or mixtures of polystyrene or copolymers on the basis of polystyrene with other homo- or copolymers, which are modified through chemical reaction according to (A), (B) or (C).

3. A membrane according to claim 2, wherein the copolymers or homopolymers of styrene contain structural units of (a) styrene, modified through chemical reaction according to (A), (B) or (C), the degree of substitution of the reactive groups on the phenyl rings of styrene being 0.05 to 3.5 meq/g, and (b) structural units of vinyl, halogen vinyl or acrylic compounds, butadiene, maleic acid or derivatives thereof.

4. A membrane according to claim 3 wherein the copolymers or homopolymers of styrene are of the formulae

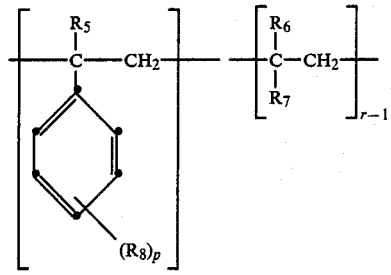

wherein R$_5$ and R$_6$ are independently of one another hydrogen, alkyl of 1 to 4 carbon atoms or halogen, R$_7$ is carboxyl, carbalkoxy with 1 to 8 carbon atoms in the alkoxy moiety, —CONH$_2$, optionally N-mono- or N,N-disubstituted, halogen or cyano, and R$_8$ is hydrogen or —R$_1$NH$_2$, —R$_2$OH or —R$_2$SH, wherein —R$_1$— is a valence bond, —C$_m$H$_{2m}$—, —(CH$_2$)$_q$NH(CH$_2$)$_{2-6}$, —(CH$_2$)$_q$O—(CH$_2$)$_{2-6}$,

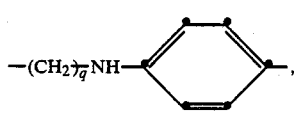

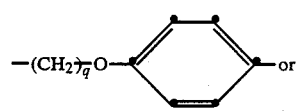

-continued

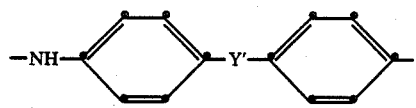

Y' is —O—, —S—, —SO$_2$—

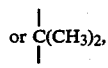

or C(CH$_3$)$_2$,

R$_2$ is a valence bond or —C$_m$H$_{2m}$—, m is an integer of 1 to 6 and q is zero or 1, the structural units being modified through chemical reaction by (a), (b) and (c); —R$_3$X, —R$_4$CHO, —NCO or —NCS, wherein —R$_3$— is a valence bond to an aliphatic residue or —C$_m$H$_{2m}$—, —R$_4$— is a valence bond or —C$_n$H$_{2n}$—, X is halogen, n is an integer of 1 to 5 and m has the indicated meaning, the structural units being modified through chemical reaction by (b) and (c), or —R$_4$CN, wherein R$_4$ has the indicated meaning the structural units being modified through chemical reaction with hydroxylamine and by (a), (b) and (c), p is 1 or 2 and r is 1 or 2, and the degree of substitution of substituent R$_5$—when it is halogen—or of substituent R$_8$—different from hydrogen—being between 0.3 and 3.5 meq/g.

5. A membrane according to claim 4, wherein the polymers or copolymers of styrene are of the formulae

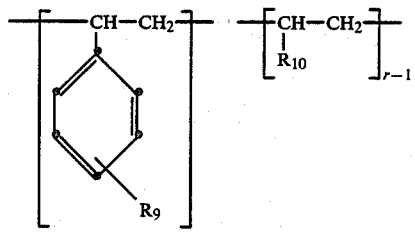

wherein R$_{10}$ is —COOH, —CONH$_2$ or —CN, r is 1 or 2 and R$_9$ is hydrogen or —CH$_2$NH$_2$, —CH$_2$OH or —NH$_2$, modified through chemical reaction by (a), (b) and (c), —CH$_2$X, wherein X is halogen, modified through chemical reaction by (b) and (c), or —CH$_2$CN, modified through chemical reaction with hydroxylamine, and by (a), (b) and (c), the degree of substitution of substituent R$_9$ —different from hydrogen—being between 0.3 and 3.5 milliequivalents/g.

6. A membrane according to claim 5, which comprises structural units of the formula

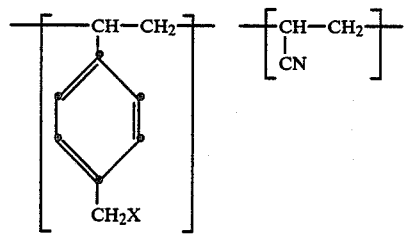

wherein X is halogen and the —CH$_2$X radical is modified through chemical reaction with a polyethyleneimine and a reactive azo dyestuff containing sulfonic acid groups and a dichlorotriazinyl radical, the degree of substitution of substituent —CH$_2$X being between 0.3 and 3.5 milliequivalents/g.

7. A membrane according to claim 5, wherein R$_9$ comprises —CH$_2$NH$_2$, modified through chemical reaction by steps (a), (b) and (c), wherein
in step (a) said monomeric compound is an organic compound that contains reactive multiple bonds or epoxide, aziridine, aldehyde, imidate, isocyanate, isothiocyanate, hydroxyl, anhydride, acyl halide, carbonic acid imide halide or N-methylol groups, or is a compound containing substituents detachable as tertiary amines or as anions, or is a compound containing a combination of these groups or substituents or both of them,
in step (b) said oligomer or polymer is a hydrophilic polyfunctional, aliphatic or aromatic oligomer or polymer containing amino, hydroxyl or thiol groups, and
in step (c) said compound is a non-ionic compound or an ionic compound containing at least one sulfonic acid group, or carboxylic group, which may be in their salt form, or ammonium group, —CH$_2$X, wherein X is halogen, modified through chemical reaction by steps (b) and (c), or —CH$_2$CN or —CN, modified through chemical reaction with hydroxylamine and by steps (a), (b) and (c).

8. A membrane according to claim 7, wherein said oligomer or polymer comprises polyethyleneimines, polyvinyl alcohols, cellulose derivatives, polyvinylamines, polyvinylanilines, polyallylamines, amino modified polyepihalohydrines, diamino condensation products of polyanhydrides, reaction products of dicyandiamide, formaldehyde and ammonium chloride, aminoalkyl polysulfones or aminoalkyl polyphenylene oxides.

9. A membrane according to claim 7, wherein said non-ionic or ionic compound (c) is a colored compound.

10. A membrane according to claim 9, wherein said non-ionic or ionic compound is a reactive azo dye containing a member selected from the group consisting of sulfonic acid groups, carboxyl groups and ammonium groups.

11. A membrane according to claim 10, wherein said non-ionic or ionic compound (c) is a reactive azo dyestuff containing sulfonic acid (—SO$_3$H) or carboxyl (—COOH) groups and as reactive groups monochlorotriazinyl, dichlorotriazinyl, 2,4-dichloropyrimidinyl, vinyl sulfonyl, β-sulfatoethylsulfonyl, β-chloroethylsulfonyl or β-sulfatoethylaminosulfonyl radicals.

12. A membrane according to claim 7, wherein said monomeric compound is a cyclic carbonic acid imide halide or a compound containing isocyanate, isothiocyanate or N-methylol groups.

13. A membrane according to claim 12, wherein said monomeric compound is a halogen-diazine or -triazine containing at least 2 reactive substituents.

14. A membrane according to claim 12, wherein said monomeric compound (a) is cyanuric chloride or tetrachloropyrimidine.

15. A membrane according to claim 7, wherein said non-ionic or ionic compound (c) is a colorless non-ionic carbonic acid imide halide, a dihalide of dicarboxylic acids or a dialdehyde.

16. A membrane according to claim 15, wherein said non-ionic or ionic compound (c) is a colorless compound containing ionic groups and halotriazinyl or halopyrimidyl radicals.

17. A membrane according to claim 1, bonded as thin film to a porous support.

18. The membrane of claim 1 wherein said degree of substitution of reactive groups in said styrene polymer is 0.3 to 3.5 meq/g.

19. A membrane according to claim 5, wherein the ion-exchange capacity of the membrane is from about 0.3 to about 3.5 meq./g.

20. A process for purifying a solution with a solute which comprises disposing on one side of a semipermeable membrane according to claim 1 a solution with a solute, said solution having an osmotic pressure, and applying a hydraulic pressure against said solution and said membrane, said hydraulic pressure being greater than the osmotic pressure of said solution.

21. A process according to claim 20, wherein effluents obtained from dye production are purified by separating off dyes from said effluents.

22. A process for concentrating a solution with a solute which comprises disposing on one side of a semipermeable membrane according to claim 1 a solution with a solute, said solution having an osmotic pressure, and applying a hydraulic pressure against said solution and said membrane, said hydraulic pressure being greater than the osmotic pressure of said solution.

23. A process for separating components dissolved in a solution which comprises disposing on one side of a semipermeable membrane according to claim 1 a solution with a solute, said solution having an osmotic pressure, and applying a hydraulic pressure against said solution and said membrane, said hydraulic pressure being greater than the osmotic pressure of said solution.

24. A process according to claim 23 which comprises separating ionic compounds of opposite charge and different molecular weights from each other.

25. A process according to claim 23, which comprises separating ionic substances from non-ionic substances.

26. A process according to claim 23, which comprises separating monovalent ions of low ionic weight from polyvalent ions of low or high ionic weight and monovalent ions of high ionic weight.

27. A process according to claim 23, wherein organic and metal-organic ionic substances are separated from inorganic by-products in a reaction mixture.

* * * * *